US011572171B2

(12) United States Patent
Quatmann et al.

(10) Patent No.: US 11,572,171 B2
(45) Date of Patent: Feb. 7, 2023

(54) PASSENGER SERVICE UNIT HAVING A COVERING, PASSENGER SEATING AREA AND VEHICLE HAVING A PASSENGER SERVICE UNIT

(71) Applicant: Airbus Operations GmbH, Hamburg (DE)

(72) Inventors: Frank Quatmann, Hamburg (DE); Guillermo Carmona-Puga, Hamburg (DE); Bernd Roschat, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 54 days.

(21) Appl. No.: 17/181,591

(22) Filed: Feb. 22, 2021

(65) Prior Publication Data
US 2021/0261257 A1 Aug. 26, 2021

(30) Foreign Application Priority Data
Feb. 24, 2020 (DE) .......................... 102020104797.5

(51) Int. Cl.
*B64D 11/00* (2006.01)
*B64D 11/06* (2006.01)
*B60Q 3/47* (2017.01)
*B60Q 3/82* (2017.01)
*B60R 13/02* (2006.01)

(52) U.S. Cl.
CPC ................ *B64D 11/00* (2013.01); *B60Q 3/47* (2017.02); *B64D 11/0632* (2014.12); *B60Q 3/82* (2017.02); *B60R 13/0212* (2013.01); *B64D 2011/0053* (2013.01); *B64D 2231/00* (2013.01); *B64D 2231/025* (2013.01)

(58) Field of Classification Search
CPC ...... B64D 2011/0053; B64D 2013/003; B64D 2031/00; B64D 2031/02; B64D 2031/025; B64D 11/00; B64D 13/00
See application file for complete search history.

(56) References Cited

U.S. PATENT DOCUMENTS

| 2,569,138 | A | * | 9/1951 | Abbott | .................. | H05B 3/342 |
| | | | | | | 439/456 |
| 5,707,028 | A | | 1/1998 | Roeper | | |
| 10,724,227 | B2 | * | 7/2020 | Hegenbart | .............. | B29C 70/74 |

(Continued)

FOREIGN PATENT DOCUMENTS

| DE | 102010034410 A1 * | 2/2012 | ............. | B64D 11/00 |
| DE | 102011116884 A1 * | 4/2013 | ............... | A62B 7/00 |

(Continued)

OTHER PUBLICATIONS

European Search Report from corresponding European Patent Application No. 21157433 dated Jun. 22, 2021.

*Primary Examiner* — Joshua J Michener
*Assistant Examiner* — Ryan Andrew Yankey
(74) *Attorney, Agent, or Firm* — Greer, Burns & Crain, Ltd.

(57) ABSTRACT

A passenger service unit, a passenger seating area, and a vehicle having a passenger service unit are provided, wherein the passenger service unit comprises a carrier element that can be extended in a longitudinal direction and a covering. The covering covers at least a section of the carrier element. At least one electrical and/or electronic element is integrated in the covering.

15 Claims, 12 Drawing Sheets

(56) References Cited

U.S. PATENT DOCUMENTS

| | | | |
|---|---|---|---|
| 11,292,610 B2 * | 4/2022 | Brüchmann | G03B 17/561 |
| 2005/0265038 A1 * | 12/2005 | Muller | G02B 6/0006 |
| | | | 362/471 |
| 2007/0066132 A1 * | 3/2007 | Rittner | A62B 7/14 |
| | | | 439/535 |
| 2015/0090839 A1 * | 4/2015 | Freund | B64D 13/00 |
| | | | 244/118.5 |
| 2015/0232182 A1 | 8/2015 | Schneider et al. | |
| 2018/0103554 A1 * | 4/2018 | Ibrahim | B64D 11/0624 |
| 2019/0303581 A1 | 10/2019 | Quatmann | |

FOREIGN PATENT DOCUMENTS

| | | | | |
|---|---|---|---|---|
| EP | 0716014 A1 * | 6/1996 | | B64D 11/00 |
| EP | 1361155 A1 * | 11/2003 | | B64D 11/00 |
| EP | 2803573 A2 * | 11/2014 | | A62B 18/02 |
| EP | 2857314 A1 * | 4/2015 | | A62B 7/14 |
| EP | 2907751 A1 * | 8/2015 | | B64D 11/00 |
| EP | 2907751 A1 | 8/2015 | | |
| EP | 3546355 A1 | 10/2019 | | |

\* cited by examiner

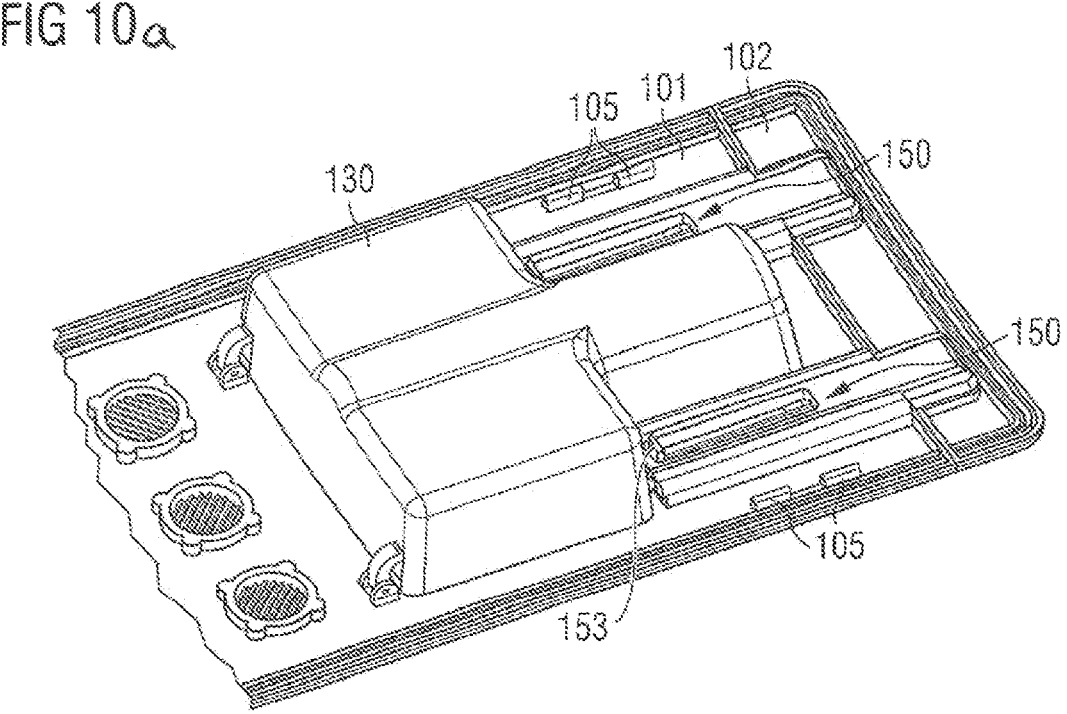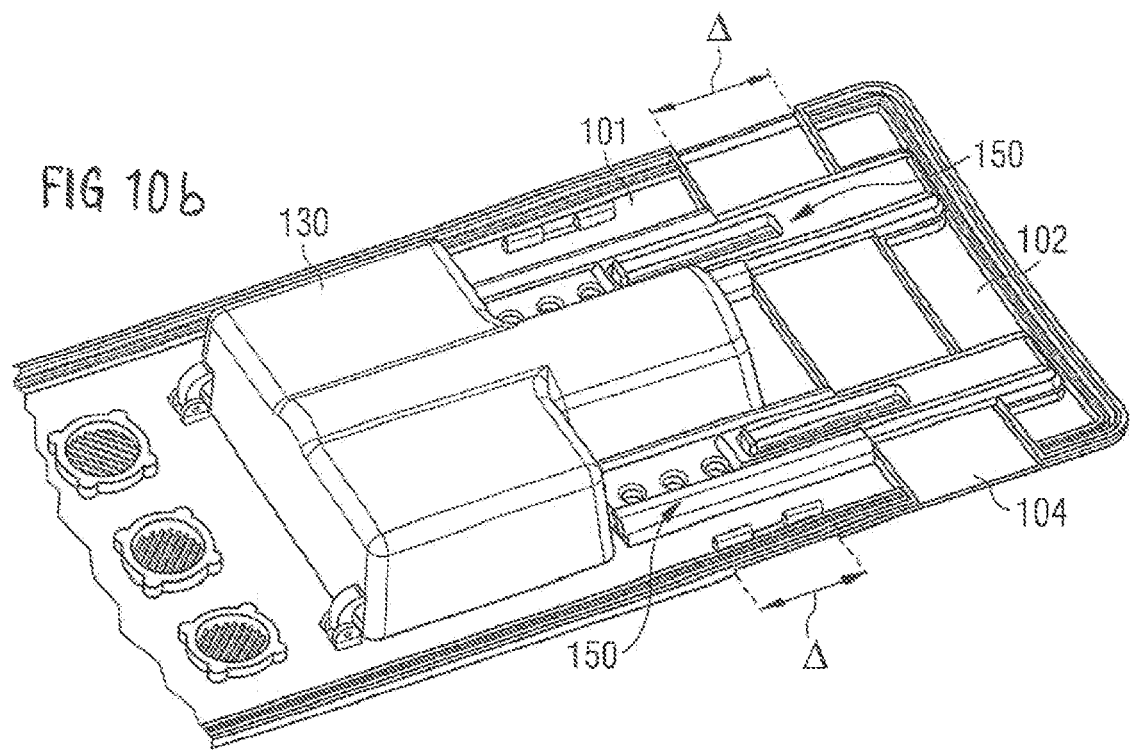

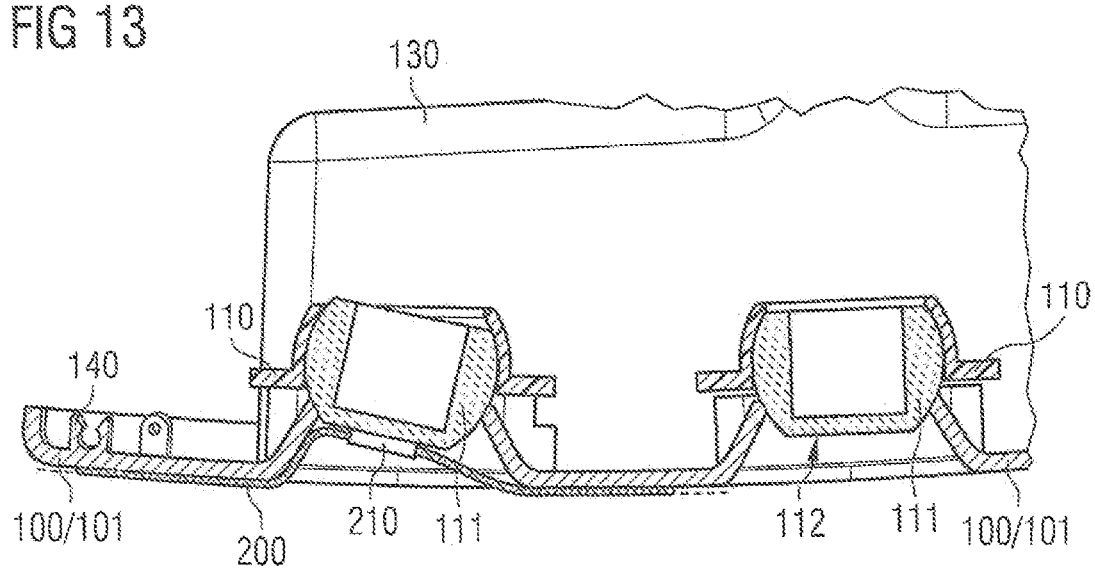
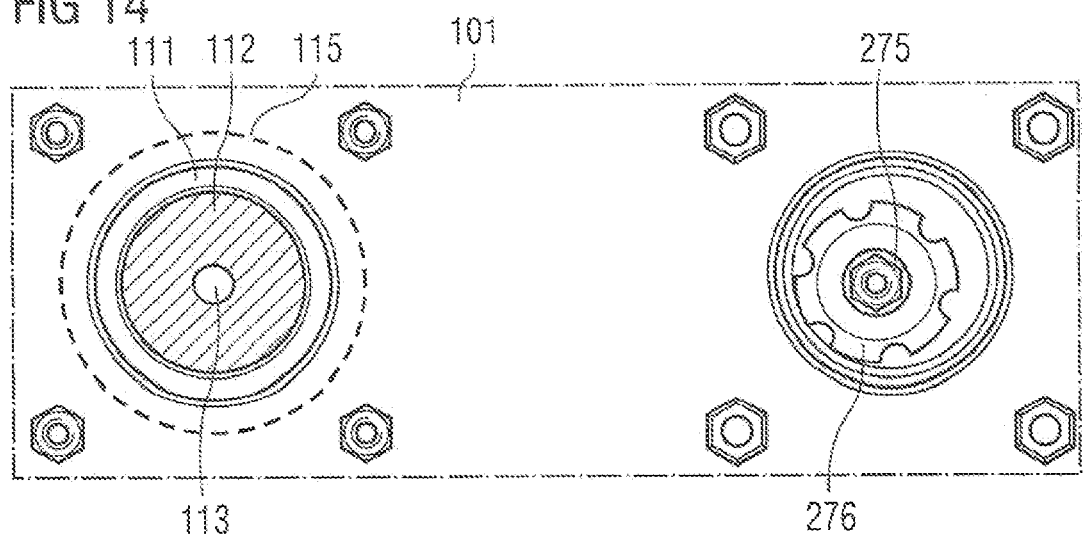

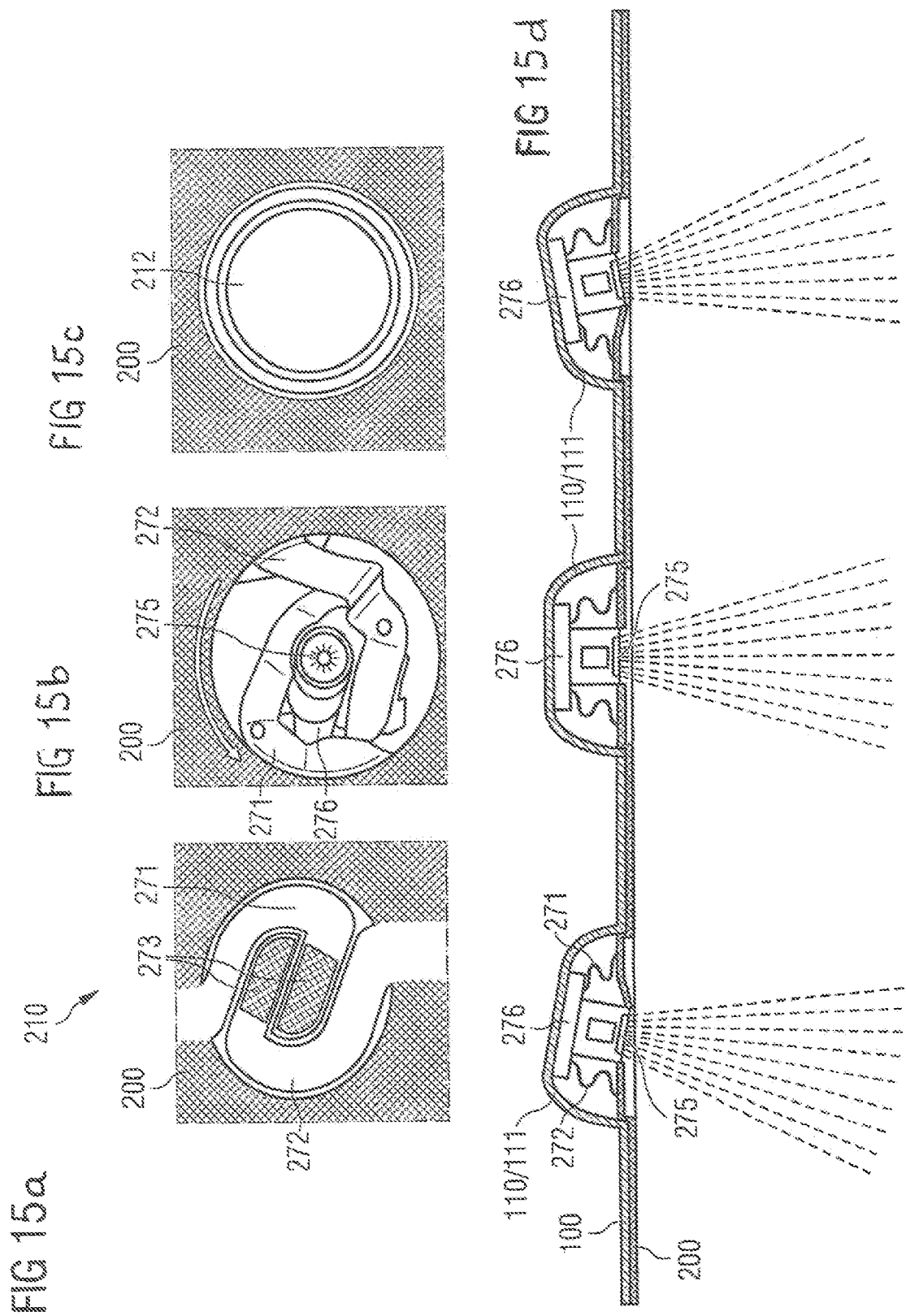

PASSENGER SERVICE UNIT HAVING A COVERING, PASSENGER SEATING AREA AND VEHICLE HAVING A PASSENGER SERVICE UNIT

CROSS-REFERENCES TO RELATED APPLICATIONS

This application claims the benefit of the German patent application No. 102020104797.5 filed on Feb. 24, 2020, the entire disclosures of which are incorporated herein by way of reference.

FIELD OF THE INVENTION

The present invention relates to a passenger service unit having a carrier element that can be extended in a longitudinal direction and a covering in which at least one electrical and/or electronic element is integrated and a passenger seating area and a vehicle having a passenger service unit of this kind.

BACKGROUND OF THE INVENTION

In public transportation, particularly in aircraft, buses or trains, visible surfaces of interior fittings are readily covered with textiles or films, as this makes for visually appealing surfaces (which therefore have a higher quality appearance) by comparison with traditional plastic surfaces.

EP 3 546 355 A1 describes an interior fitting covered with fabric, wherein the fabric has an integrated display device. For example, the fabric may be made of electrophoretic fibers, or contain such fibers, in order to create a display device. Hence, a passenger seat is described which is covered with a material of this kind, in order to display passenger information.

SUMMARY OF THE INVENTION

A problem addressed by the invention is that of providing a visually appealing interior fitting with additional functions for a vehicle.

According to a first aspect for improving understanding of the present disclosure, a passenger service unit for installation in a passenger seating area of a vehicle comprises a carrier element that can be extended in a longitudinal direction. In addition, the passenger service unit comprises a covering in which at least one electrical and/or electronic element is integrated. The covering in this case can cover the carrier element, at least sectionally.

A passenger service unit is also referred to as a personal/passenger service unit (PSU) and offers a passenger certain functions which he can control from the passenger seat. For example, a PSU may have outlet nozzles for fresh air, lamps for individual passenger seats (in particular, reading lamps), but also a call button to call for service personnel. In aircraft, a PSU may also include oxygen masks which fall from above the passenger seat in case of an emergency. A PSU must therefore be arranged at a given position relative to the passenger seat(s).

The carrier element that can be extended in a longitudinal direction may have different dimensions in different directions. The size of the carrier element can be changed in at least one of these directions, for example extended, or it can be shortened. The longitudinal direction in this case should be understood to mean the direction in which the size of the carrier element can be changed. This direction may coincide with a longitudinal direction of a vehicle (in other words, the direction of travel of the vehicle) in which a passenger service unit of this kind can be installed, which is why reference is simply made to the longitudinal direction here.

The covering material may be a textile, a film, silicon, rubber or also another stretchable material/fabric. In particular, smart fabrics or smart clothes can be used for the covering.

The at least one electrical and/or electronic element is integrated in the covering through a corresponding selection of a given fabric, in particular smart fabrics or smart clothes are used as fabrics for a textile covering. Alternatively or in addition, certain fibers can be selected which are used in the covering. These include electrically conductive fibers, for example. In addition, electrophoretic fibers which are capable of changing their color at least sectionally when an electric field is applied or thermochromic fibers which change their color under the influence of temperature may also be present in a covering. Likewise, fibers with which a capacitive change can be recognized can also be used. For example, when a finger or similar capacitive influence draws near or makes contact from outside, a property of the fiber can change and this can be detected accordingly in a control system. Hence, fibers of this kind can be woven, knitted, interlaced or otherwise incorporated in the fabric of the covering. Electrical and/or electronic components such as light-emitting diodes (LEDs), (separately designed) touch sensors, and the like, can, of course, be integrated in the covering. In addition, sensors which can produce signals for controlling further electrical and/or electronic components can also be integrated in the covering. For example, sensors for determining temperature, brightness (light), atmospheric humidity, or the like, can be integrated in the covering as electrical and/or electronic components. With the help of the sensor signals, general ventilation or a personal fresh air nozzle for the individual passenger can be activated/deactivated, for example, when the temperature and/or atmospheric humidity crosses a predefined threshold value or a reading lamp for the individual passenger can be activated/deactivated when a brightness below a threshold value is measured. These sensors may, on the one hand, already be integrated in fibers prior to production of the fabric for the covering; on the other hand, they may also be integrated in the fabric subsequently.

The (remaining) fibers of the covering may be produced from any material. For example, a fabric made of a natural material (cotton, wool, flax, hemp, etc.) may be used. Likewise, artificial materials can be used, such as plastics, that can be processed into fibers, silicon, glass (fibers), carbon, etc., for example.

When using plastics for the flexible covering, such as films, stretch films or silicon, it is likewise possible for strip conductors and/or electrical components to be integrated in the component. Integration likewise means that the electrical and/or electronic element can be applied as a further material layer.

Using a covering for the passenger service unit means that a standard carrier element can be used for the (entire) passenger service unit, while the covering can be adapted to the requirements of the vehicle operator or vehicle owner. Consequently, the covering need only be adapted to the color requirements and other design options of the vehicle owner, for example by printing, dyeing one or multiple fibers or layers of the covering, etc. In addition, decorative elements can be applied to the covering or incorporated in the fabric or material of the covering through a corresponding color scheme.

In addition to the particularly attractive appearance of the covering, the integration of electrical and/or electronic elements in the covering means that a plurality of functions can be offered for passengers on the surface of the passenger service unit. In this way, a passenger service unit with a high-quality appearance can be created at little cost. In addition, the functions of the passenger service unit can be changed or adapted by simply replacing the covering, without having to install a completely new passenger service unit.

The carrier element may be produced from plastic or metal or a mixture or combination of the two.

In one implementation variant, the covering may form a pocket in which the carrier element is at least partially inserted, so that the covering is fastened to the carrier element. In other words, the covering has a double-layer design on one side (or at one end), as a result of which the covering can be arranged on two sides of the carrier element or lie adjacent thereto. This allows quick fastening of the covering to the carrier element, as only the carrier element need be introduced into the pocket. For example, the covering may be of such a size that a first portion is the same size as a flat (front) side of the carrier element and a second portion of the covering adjacent to the first portion is smaller than the flat side of the carrier element. The second portion can therefore be arranged on a (rear) side of the carrier element facing away from the flat side of the carrier element and enclose an edge of the carrier element lying therebetween. The covering may comprise further portions which enclose at least one further edge and/or are at least arranged on a further part of the (rear) side of the carrier element.

Hence, the covering may also form a pocket (have a pocket-shaped design) on each of two opposite sides, so that two opposite sides (ends) of the carrier element can each be introduced into a pocket. In this way, the covering can be securely fastened to the carrier element. In this case, each pocket can be closed on at least one of its side portions where the first and second (further) portion of the covering come to lie against one another. In this way, the covering can be easily attached, a front side of the carrier element being completely covered by the covering.

Each of the pockets may be provided with a rubber band which is particularly located in the portion of the covering which is arranged on the rear side of the carrier element. In this way, the tension in the covering which is located on the front side of the carrier element is guaranteed and a fixing of the carrier element in the pocket is improved. Alternatively or in addition, the covering which is arranged on the rear side of the carrier element may be flexibly configured, so that it applies the tension in the covering itself.

On sides of the covering on which no pocket is arranged, the covering may be of such a size that it encloses at least one edge of the carrier element. In this way, the carrier element can be completely covered by the covering on one (front) side. In other words, a possible embodiment therefore envisages that instead of pockets, the covering is also formed with the covering of edges of the carrier element.

In the description provided here, a front side of the carrier element relates to a side facing a passenger area when the carrier element is installed in the passenger area (for example in a portion of a vehicle). In other words, the front side of the carrier element is visible following installation in the passenger area. The rear side of the carrier element is correspondingly the side opposite the front side which is not visible, at least sectionally, following installation in the passenger area or faces the primary structure of the vehicle.

In another design variant, the carrier element may comprise a first portion and a second portion, wherein the first portion and the second portion of the carrier element are coupled to one another.

For example, the first and second portions of the carrier element may be connected to one another and they may be movable with respect to one another. The carrier element may, in particular, have a two-dimensional basic shape, wherein the second portion can be moved within this surface (plane) and/or out of this surface relative to the first portion. In this way, at least one dimension of the carrier element can be changed. The movement may be a linear movement, a rotational movement, or a combination of the two (for example, displacement along a curved path).

Alternatively or in addition, the second portion of the carrier element can be attached and fastened to the first portion of the carrier element. For example, the second portion may comprise a projecting holding device which matches a corresponding receiving means on the first portion of the carrier element and can be fastened thereto/therein. Likewise, multiple second portions can be attached and fastened to the first portion, in order to alter the extent of the carrier element in the longitudinal direction.

The change in size of the carrier element in each case allows an adjustment of the carrier element, and therefore also of the passenger service unit, during installation of the passenger service unit in a vehicle. The size in this case can be changed in such a manner that the carrier element is lengthened or shortened. A passenger service unit is usually installed along an associated service channel in the vehicle. Positioning along the service channel in this case takes account of the position of a passenger seat, or a row of passenger seats, below the service channel. If the distance between two consecutive passenger seats, or rows of passenger seats, is changed, a corresponding adjustment can be made by altering the size of the carrier element. The filling elements normally required for this, which constitute a separate cover of the service channel, can therefore be dispensed with. Since only the individual covering can be seen rather than (as is customary) a passenger service unit with further filling elements, the ceiling area of the vehicle can be made more visually appealing.

Where a second portion of the carrier element can be moved linearly or along a curved path, the first portion and the second portion of the carrier element can be arranged in an overlapping manner. At least part of the second portion of the carrier element may overlap a corresponding part of the first portion of the carrier element. In particular, if the second portion lies adjacent to the first portion of the carrier element or is at the smallest distance from the first portion of the carrier element, this overlap may exist. If the second portion is remote from the first portion (greatest possible distance with movement) the overlap may be minimal or removed entirely. This makes it possible for the covering always to lie adjacent to a portion of the carrier element. In other words, there is no cavity on the rear side of the covering which can otherwise be pressed into the cavity upon contact. The covering could be damaged (for example punched) during this, something that is prevented by the extended overlapping region of the second portion of the carrier element.

In yet another design variant, the first portion and the second portion of the carrier element can be coupled to one another in a linearly movable manner via at least one rail. In this case, the at least one rail may be L-shaped, T-shaped, round, elliptical, etc. in design and be operatively connected to a corresponding L-shaped, round, elliptical or similarly designed rail. In this case, a first rail is attached to the first portion of the carrier element and a second matching rail to the second portion of the carrier element. Rather than a second rail, at least one mounting can also be arranged, along which the rail of the other portion of the carrier element can slide. By completely removing the second portion of the carrier element from the first portion of the carrier element, for example through removal of the rail from the associated mounting, one dimension of the carrier element can also be shortened.

In a further design variant, the passenger service unit may, in addition, comprise a locking device which fixes a relative position of the second portion of the carrier element to the first portion of the carrier element. The locking device is therefore set up to block/lock the movement of the second portion of the carrier element relative to the first portion thereof in any position. The locking in this case may be infinitely variable and/or take place at positions in a predetermined pattern. For example, the predetermined pattern may have spacings that correspond to the spacings of fastening positions in passenger seat rails. If, for example, passenger seats or rows of passenger seats arranged behind one another are moved in the seat rail by the fixed spacing of the fastening positions, the size of the carrier element, and therefore of the passenger service unit, can be quickly adjusted Infinitely variable locking may, for example, take place by means of a screw or other clamping device which fixes the movable rail in any position.

In one design variant, the covering may be designed to be stretchable at least in sections. For this purpose, the covering may comprise stretchable fibers or other stretchable materials. In particular, the covering may be flexibly configured in the section, in that the second section can be moved from the first section of the carrier element, so that the covering does not impede movement. Only by way of example, the covering may comprise silicon/rubber-like material, so that it is stretchable at least in sections.

Alternatively or in addition, the covering may also be of such dimensions that without substantial stretching it can enclose the front side of the carrier element when the second portion of the carrier element is located furthest away from the first portion of the carrier element. In addition, an opening may be provided between the first and second portion of the carrier element. If the second portion is moved to the first portion of the carrier element (the carrier element becomes shorter overall), the surplus covering can be tucked through the opening to the rear side of the carrier element. For example, the covering can be trapped between the first and the second portion of the carrier element, which means that the visual appearance of the passenger service unit is not excessively impaired, as only the trapped fold will be visible.

In another design variant, the covering is opaque. This also applies to a stretchable portion of the covering. The covering should at least remain opaque over a stretching area (maximum possible change in size of the covering corresponding to the maximum possible change in size of the carrier element). For example, the fiber density of the fabric for the covering may be increased for this purpose. The covering may of course also be made of fibers connected (for example adhered) to one another, which are furthermore stretchable at least in sections. The covering may also be made of a membrane or film in which the electrical and/or electronic elements are integrated.

In a further design variant, the covering may be arranged on a stretchable plastic form, the stretchable plastic form being formed in such a manner that it can be pulled over the carrier element. In particular, the plastic form may be of such a size that it encloses the front side of the carrier element and the edges thereof and is held at least sectionally on a rear side of the carrier element. The covering in this case may be adhered to the stretchable plastic form or otherwise fastened thereto in planar fashion. The covering may, of course, also be made of a stretchable material which performs the function of the stretchable plastic form. Simply by way of example, mention is made of a silicon form which can be pulled over the carrier element.

Alternatively, a stretchable plastic form can also be fitted over the covering when the covering is already on the carrier element. If the plastic form has a transparent design, additional protection of the covering and the electrical and/or electronic elements integrated therein can thereby be guaranteed, while the covering can be fastened to the carrier element easily and securely.

Simply by way of example, the plastic form may be made of silicon. This facilitates a transparent, stretchable and durable plastic form both over, and also under, the covering.

In yet another design variant, the carrier element may comprise a fastening device arranged circumferentially at least in sections, to which fastening device a circumferential edge of the covering is fixed. Arranged circumferentially means in the edge region of the carrier element along a circumferential edge. For example, the fastening device may be arranged on the edge or close to the circumferential edge of the carrier element, for example on a rear side of the carrier element. In this case, the fastening device need not run continuously along the entire periphery of the carrier element, but only along sections thereof.

For example, the fastening device may be configured in the form of a groove in which the covering is trapped by means of a clamping cord. A clamping cord is made of a flexible material, for example, which is larger in size than the cavity formed by the groove, so that the clamping cord is trapped in the groove and thereby presses the covering against the inside of the groove. The groove may, of course, also be produced from flexible material into which a (fixed or flexible) clamping cord is inserted and thereby secures the covering.

Alternatively or in addition, the fastening device may also comprise at least one magnet or a magnetically active material, so that the covering can be held on the fastening device by means of magnetically active materials or a magnet.

Likewise alternatively or in addition, the fastening device may also comprise a portion of a Velcro strip comprising a barbed hook which is fastened to the rear side of the carrier element, the barbed hooks being set up to interlock with the covering. This allows simple, cost-effective fastening of the covering to the rear side of the carrier element.

In one design variant, the fastening device is arranged on a rear side of the carrier element. In this case, the covering is preferably of such a size that it completely covers the front side of the carrier element and extends around the outer edge of the carrier element at least up to the fastening device on the front side of the carrier element. Folds in the covering on the front side of the carrier element are avoided by the covering being completely taut circumferentially which produces a visually high-quality appearance and yet very quick and simple installation is made possible.

In one implementation variant, the at least one electrical and/or electronic element may comprise a button, a lighting means and/or an illuminated or illuminating symbol. The button may be provided with a switch function, so that it acts as a call button or a switch for lighting, for example. It is also possible for the button to control the volume of a loudspeaker or headphone socket or the shading of a window, or the like. Two buttons can also be used in pairs for this purpose, in order to manage the corresponding upwards and downwards control.

Alternatively, the button may simply make an electrical circuit, provided it is touched and/or pressed, while a control takes over the actual switching action.

Multiple keys with the same function can of course also be provided in the covering. For example, buttons with the same function can be provided for each passenger to whom this passenger service unit belongs. For example, the passenger service unit may belong to a row of seats having at least two seats. Particularly in the case of a call button, this allows precise allocation to the passenger concerned, while traditional passenger service units usually have only one call button.

The lighting means may act as general lighting of an area around the passenger service unit. The use of smart fabrics means that a plurality of lighting means can also be integrated in the covering or a plurality of fibers can be activated for light emission. In this way, the covering, and therefore the passenger service unit, can be caused to illuminate either in sections or completely. The color of the radiated light can also be adjusted, so that the area around the passenger service unit (in particular passenger seats arranged below the passenger service unit) can be illuminated. Alternatively or in addition, the lighting means may also be focused on a given passenger seat and, for example, used as a reading lamp. Where there is an arrangement of multiple passenger seats, multiple lighting means can of course be provided, so that each passenger seat is assigned a reading lamp.

The symbol may be arranged such that it lights up independently in the covering (symbol made of self-illuminating regions or fibers of the covering) and also combined with a lighting means (the lighting means acts as background lighting for a symbol provided in the covering). The symbols may involve instructions to passengers, for example, the illumination of which can be centrally controlled. For example, the symbols involved may be "No smoking," "Do not use mobile phones," "Fasten seatbelts," etc.

A button may of course also be combined with a symbol and/or a lighting means. For example, when the button is activated (a switching action), a symbol may be independently illuminated in the covering or illuminated by a lighting means in order to confirm the switching action, and when the button is pressed again, the illumination of the symbol is once again turned off.

In another design variant, the carrier element may comprise a portion that is pivotable as compared with the remaining carrier element, wherein a position of the pivotable portion coincides with a position of one of the at least one electrical and/or electronic element. In other words, the pivotable portion is arranged on a rear side of the electrical and/or electronic element when the covering is arranged on, and fastened to, the carrier element. In this way, an orientation of the covering in the region of the electrical and/or electronic element can be changed in the space.

Simply by way of example, the pivotable portion may relate to a peripheral portion of the carrier element on which symbols are provided in the covering. By swinging out the portion of the carrier element, the symbols can be brought into a position that is more clearly visible. For example, the centrally controlled symbols described above can be arranged on a pivotable portion of the carrier element which can be folded out from a general ceiling surface of the passenger seating area into the passenger seating area. This means that the symbols are not on the ceiling of the passenger seating area but adopt a position in which they can be seen more clearly by a passenger. The folding-out may take place manually or be mechanically controlled. Hence, for example, symbols which indicate the need to fasten seatbelts, and the like, can be displayed in an aircraft during takeoff and landing within the field of vision of the passengers. The covering is flexible and can therefore follow the movement of the pivotable portion of the carrier element. An otherwise necessary and costly cable run can be dispensed with as there is an electrical supply in the covering.

It is likewise conceivable for the pivotable portion to be arranged in a center region of the carrier element, so the otherwise planar carrier element exists about the pivotable portion. In this way, the pivotable portion may adopt a different orientation deviating from the remaining carrier element. The pivotable portion in this case may adopt a round shape, an elliptical shape, a rectangular shape, or any polygonal shape.

Alternatively or in addition, the pivotable portion of the carrier element may be fitted with part of a Velcro strip comprising barbed hooks on a side facing the covering, wherein the barbed hooks are set up to interlock with the covering. Consequently, the covering is carried along in the region of the pivotable portion during each movement of the pivotable portion. If there is an electrical and/or electronic element in this region of the covering, this can easily be changed in terms of its orientation. For example, a lighting means and, in particular, the light cone thereof, can easily be oriented by the pivotable portion.

Likewise alternatively or in addition, the pivotable portion of the carrier element can be provided with a magnet, or a magnetically active material, on a side facing the covering, wherein a magnetically active material, or a magnet, is integrated in the covering at a corresponding position. This likewise allows a quickly set-up fastening of the covering to the pivotable portion.

Simply by way of example, the pivotable portion may be provided in the form of a ball joint in/on the carrier element. For this purpose, a mounting in the form of a capsule can be provided, into which a spherical component is inserted. On the side of the spherical component facing the covering, the spherical component may have a flattened area to which the covering is fastened. The flattened area may be arranged in such a manner that the pivotable portion can be moved into a position, so that the flattened area and the region of the carrier element arranged thereabout form a continuous, joint plane.

In a further design variant, an electrically conductive strip conductor (electrical line) which is electrically connected to the at least one electrical and/or electronic element can be integrated in the covering. This facilitates an electrical connection of the electrical and/or electronic component that cannot be seen. In addition, the individual electrical connection of the electrical and/or electronic element during installation of the passenger service unit is dispensed with, as both the strip conductor and the electrical and/or electronic element are integrated in the covering.

Alternatively or in addition, different strip conductors or conducting paths are arranged in different layers in the covering. In this way, strip conductors in one layer can be assigned a particular function. For example, the strip conductors for supplying power to lighting elements can be arranged in a first layer, while strip conductors for connecting switch elements (buttons) are arranged in another layer.

In yet a further implementation variant, the covering may comprise a contact arrangement with a plurality of contacts for connecting the electrically conductive strip conductor(s). The covering may of course also contain a plurality of electrical and/or electronic elements and an (associated) plurality of strip conductors which are all connected to the contact arrangement of the covering.

Likewise, the carrier element may comprise a contact arrangement with a plurality of contacts which are set up to make electrical connections with the plurality of contacts in the contact arrangement of the covering by making reciprocal contacts. The two contact arrangements of the carrier element and the covering thereby form an electrical connection between the carrier element and the covering. Both contact arrangements can be designed as a plug-in connection. However, contact arrangements in which the plurality of contacts in each case simply touch one another without being inserted into one another are easier to connect. For this purpose, the plurality of contacts in each case can be arranged in each of the contact arrangements substantially in one plane. Where necessary, the contacts can easily stand out from a housing of the contact arrangement or project from the housing. In this way, the plurality of contacts of the two contact arrangements can easily be placed on one another and produce a reliable electrical contact.

The contact arrangement of the carrier element may be connected to a control system which conducts electrical signals to the plurality of contacts of the contact arrangement, in order to control the at least one electrical and/or electronic element in the covering. The control system may be arranged on the carrier element, for example on a rear side of the carrier element.

Alternatively, the control system may also be provided centrally at another point of the vehicle and connected to the contact arrangement of the carrier element via electrical lines. The control system may be part of a passenger cabin management system, for example, if many of the electrical and/or electronic elements have to be centrally controlled (in the case of illuminating symbols) or signals have to be conducted from many of the electrical and/or electronic elements to a central point (for example call button).

Alternatively or in addition, the control system may also represent only a power supply which applies a voltage to the at least one electrical and/or electronic element (via the contact arrangements and electrical lines). In addition, the control system may, in particular when arranged on the carrier element, comprise an electrical and/or electronic component which controls the electrical and/or electronic element in the covering. Hence, for example, a further electrical and/or electronic element can be controlled in the covering when a button/switch is activated in the covering, as with the switching-on and off of a light, for example.

Likewise alternatively or in addition, the control system may be integrated in the covering. Circuits, in particular, can have very thin designs and therefore be integrated in the covering. The contact arrangement of the covering may simply act as the power supply to the covering and its circuits/control system in this case.

Furthermore alternatively or in addition, the contact arrangement of the carrier element may comprise a holding device and/or the contact arrangement of the covering may comprise a holding device. In this case, the holding device in each case is set up to hold the other contact arrangement. By way of example, one magnet or multiple magnets can be arranged in a contact arrangement, which magnet/magnets can be operatively connected to a magnetically active component (or likewise a magnet) at a corresponding position of the other contact arrangement. By having magnets with corresponding poles in both contact arrangements, a quick electrical connection between two contact arrangements is possible, the correct polarity of the individual contacts of the contact arrangements being guaranteed.

In another implementation variant, the passenger service unit may, in addition, comprise oxygen mask storage which is set up to receive oxygen masks and, in an emergency, to clear an opening for access to the oxygen masks. The oxygen mask storage is arranged on a rear side of the carrier element, for example, and the opening extends through the carrier element from the rear side thereof to the front side thereof. The opening can be closed by a flap which can be opened in an emergency. The opening of the flap can be centrally controlled, wherein the flap can be pretensioned, for example, and opened automatically following the release of a lock.

In a further implementation variant the covering may have a perforation (for example a micro-perforation), the position of which corresponds to the opening of the oxygen mask storage or the flap thereof. The perforation in this a case may be set up to allow an opening in the covering which corresponds to the opening in the oxygen mask storage. In the example with a flap closing the opening in the carrier element, the perforation may be set up to tear when the flap is opened. The flap may, in addition, also be provided with a Velcro strip comprising barbed hooks, so that when the flap is opened, the portion of the covering fastened to the barbed hook moves with the flap. In any case, oxygen mask storage concealed from view (by the covering) can be provided which supplies passengers with oxygen masks in case of emergency in the usual manner.

In another implementation variant, the passenger service unit may comprise an opening for a fresh air supply. For example, the carrier element may comprise an opening and the covering may also comprise an opening at a point corresponding to the opening in the carrier element. In this way, a traditional fresh air supply, in particular a fresh air nozzle that can be adjusted by a passenger can be installed on the carrier element.

The opening in the carrier element may, in addition, be used for arranging a loudspeaker. Alternatively, a separate opening in the carrier element can be provided for a loudspeaker. Since the sound of the loudspeaker can penetrate the fabric covering, there is no need for an opening in the fabric covering at a corresponding position. In the case of a non-permeable, rubber or film-like covering, however, an opening of this kind must be provided as an alternative.

According to a further aspect, to improve understanding of the present disclosure a passenger seating area for a vehicle comprises at least one passenger service unit according to the first aspect or one of its implementation variants. In particular, the at least one passenger service unit may be arranged in a ceiling area of the passenger seating area above at least one passenger seat. For example, the at least one passenger service unit may be arranged in a ceiling area of the passenger seating area which an average passenger can reach with their hands while seated.

A service channel which is part of a ceiling structure above the passenger seating area may be arranged above the passenger seating area. Lines for supplying the individual passenger service units can be arranged in the service channel, for example a power line, fresh air line, oxygen line, etc.

In addition, the service channel may comprise an installation rail or another mounting, while a passenger service unit is fitted with a corresponding component that can be brought into engagement with the installation rail or mounting and thereby holds the passenger service unit in the service channel. For example, a simple clamping device can be arranged in the service channel, in which a corresponding holding element of the passenger service unit can be clamped. A click-in mounting for the passenger service unit can thereby be realized.

In one implementation variant, the carrier element of the at least one passenger service unit may comprise a curved portion, wherein the curved portion extends from the ceiling area of the passenger seating area towards the passenger seat. The curved portion can be seen more easily by passengers sitting or standing in the passenger seating area, as it is at a better angle to the axis of vision of the passengers (compared with a continuous plane forming the ceiling).

In a further implementation variant, a plurality of carrier elements can be installed with the passenger serviced unit in the service channel. A single covering in this case can cover the plurality of carrier elements. This allows a continuous, coherent picture, which produces a visually appealing ceiling design for the vehicle. In addition, multiple passenger service units can also be installed quickly with the necessary functionality which is integrated in the covering.

According to yet another aspect for improving understanding of the present disclosure, a vehicle may comprise at least one passenger service unit according to the first aspect and/or at least one passenger seating area according to the other aspect. The vehicle may be any mode of transport, in particular mass transportation means. For example, the vehicle may be an aircraft, a train, a bus, a ship, or the like. The at least one passenger service unit may of course also be installed in an automobile or the driver's cab in a truck.

In addition, the aspects, implementation variants and others described above can of course be combined without this being explicitly described. Each of the design variants described should therefore be regarded as optional to each of the aspects, embodiments and variants or combinations thereof. The present disclosure is not therefore limited to the individual embodiments and design variants in the order described or to a particular combination of aspects and design variants.

BRIEF DESCRIPTION OF THE DRAWINGS

Preferred exemplary embodiments of the invention are explained in greater detail with the help of the schematic drawings attached, wherein:

FIGS. 10a and 10b show schematically perspective views of a rear side of a carrier element with oxygen mask storage and a movable portion of the carrier element;

FIG. 13 shows schematically a side view of an embodiment of a pivotable portion of a carrier element;

FIG. 14 shows schematically a plan view of pivotable portion of a carrier element;

FIGS. 15a, 15b, 15c and 15d show schematically views of an electrical/electronic element in a covering and an associated sectional view;

DETAILED DESCRIPTION OF THE PREFERRED EMBODIMENTS

Figure 1:
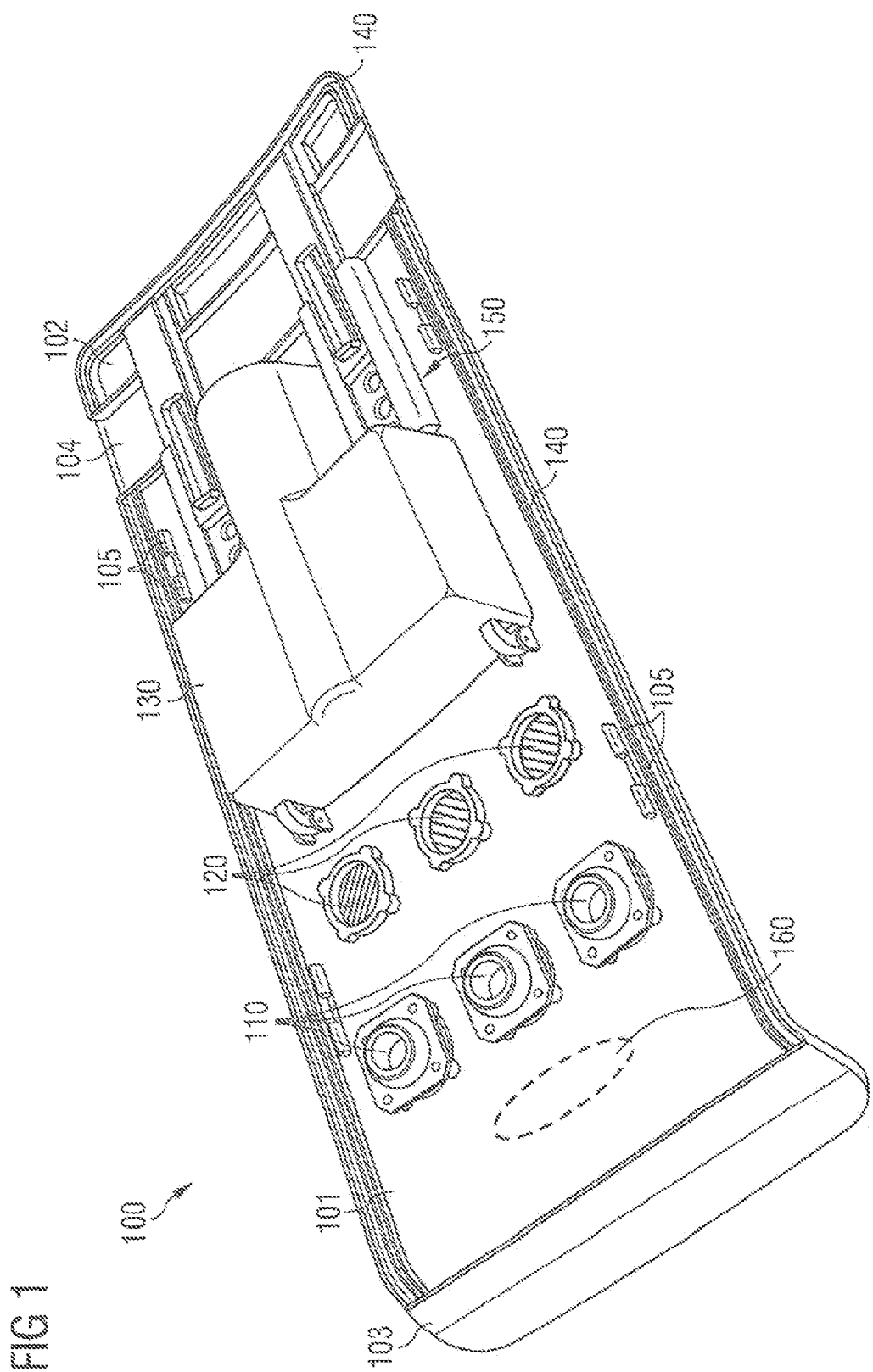
FIG. 1 shows a schematic, perspective view of the rear side of a carrier element.
Figure 2:
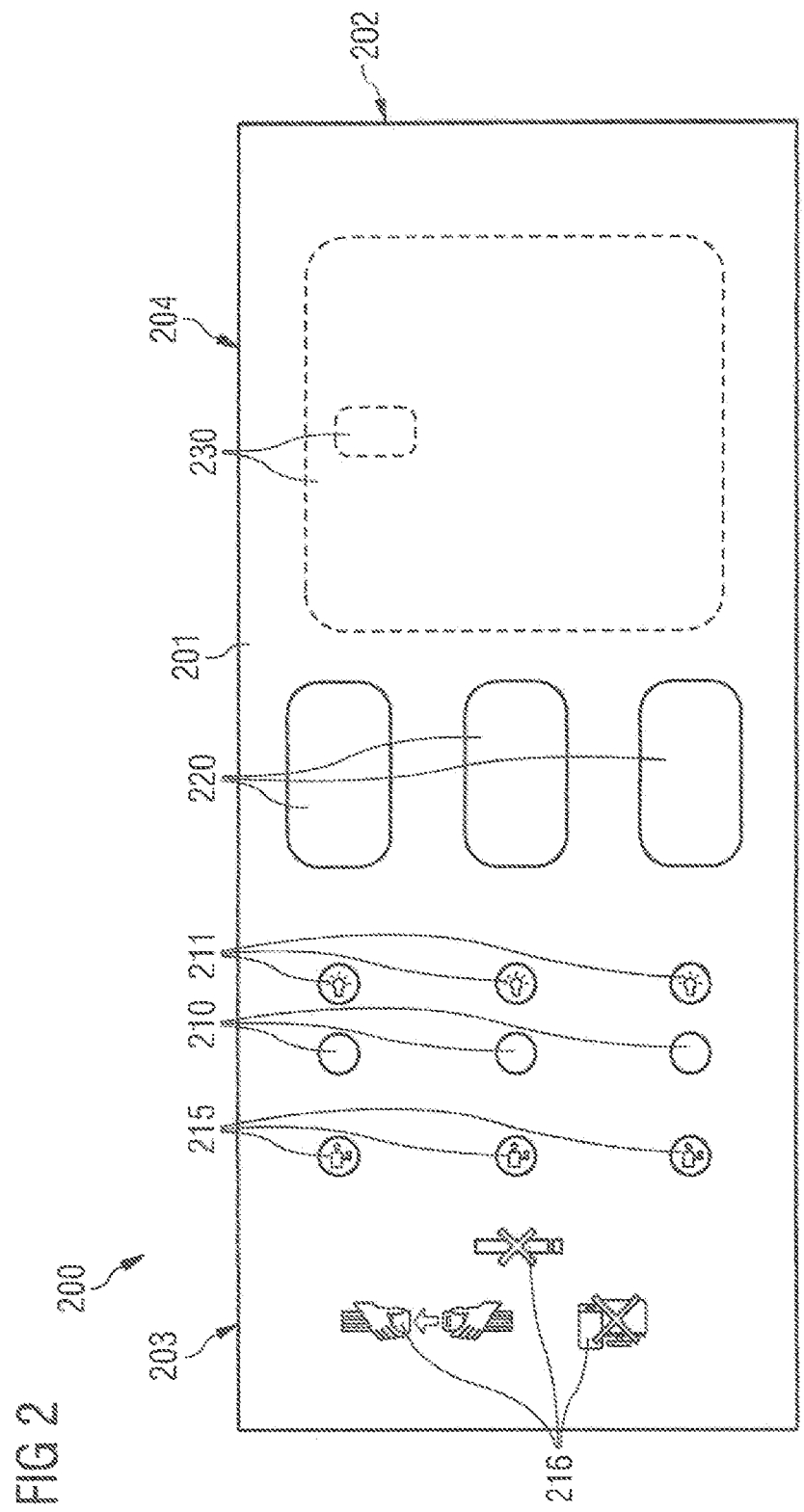
FIG. 2 shows schematically a covering.
Figure 3:
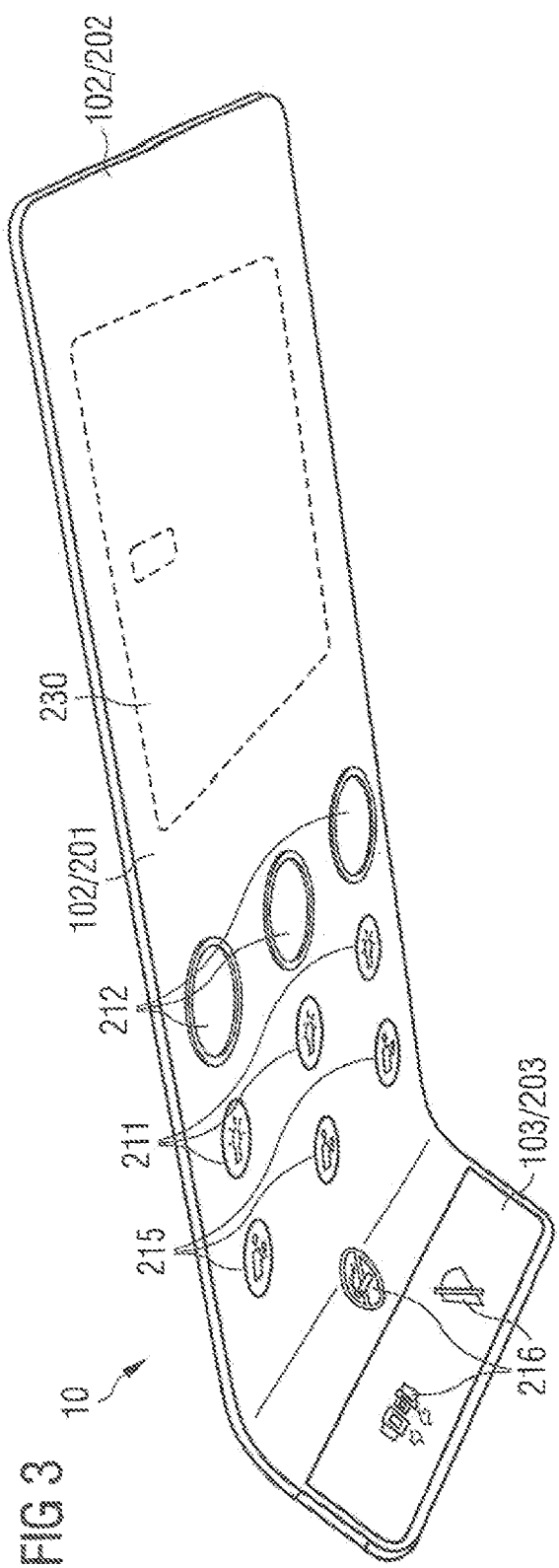
FIG. 3 shows schematically a perspective front view of a passenger service unit.

A passenger service unit 10 which comprises a carrier element 100 and a covering 200 is depicted in FIGS. 1 to 3. The rear side of the carrier element 100 can be seen in FIG. 1. The carrier element 100 has, in particular, a flat, thin first portion 101 which extends substantially in a plane that forms a ceiling portion of a passenger seating area 2 (FIG. 17), or is oriented parallel thereto. The first portion 101 may also adopt other forms, wherein a front side which is flat wherever possible (the facing side in FIG. 3 or the side that cannot be seen in FIG. 1) creates a visually appealing surface for the covering 200.

Figure 17:
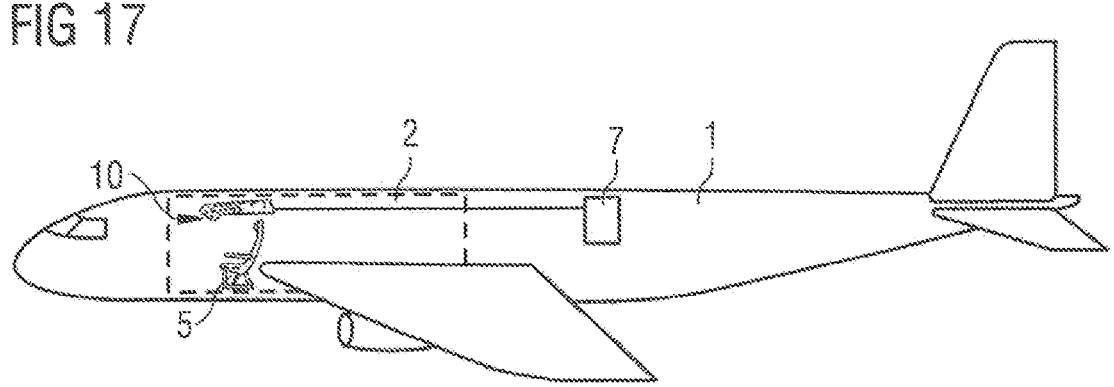
FIG. 17 shows schematically a vehicle having a passenger seating area and a passenger service unit.

On the rear side of the carrier element 100, holding devices 110, for example for holding lighting elements, and openings 120, for example outlet openings for fresh air, and/or ventilation grilles and/or loudspeakers can be provided. In addition, oxygen mask storage 130 can be provided in which oxygen masks are stored. This is particularly provided for in passenger service units 10 in aircraft 1 (FIG. 17).

The carrier element 100 may, in addition, comprise a second portion 102 which is connected to the first portion 101 and is movable relative thereto. In this way, the length of the carrier element 100 can be variably configured. A further portion 104 may be provided in an overlapping area which can be configured as part of the second portion 102 and during the movement of the second portion 102 overlaps with the first portion 101 by different degrees, as is described in greater detail in relation to FIGS. 10 and 11.

In addition, the carrier element 100 may comprise a third portion 103 which projects from the first portion 101 in a curved manner. In particular, the third portion 103 is at an angle to the plane formed by the first portion 101. This allows better visibility of the third portion 103, as is shown in FIG. 3.

Finally, mountings 105 may be arranged on the rear side of the carrier element 100. These mountings 105 are used to fasten the carrier element 100 and therefore the passenger service unit 10 in a vehicle 1. Cylindrical mountings 105 which can be inserted into corresponding clamping devices in the vehicle, by means of which the passenger service unit 10 is held, are only depicted by way of example.

The covering 200 creates the visible surface of the passenger service unit 10 on the front side of the carrier element 100. Corresponding to the carrier element 100, the covering 200 has a first portion 201, a second portion 202, and a third portion 203 which substantially correspond to the dimensions of the corresponding portions 101 to 103 of the carrier element 100. In order to guarantee the movement of the second portion 202 of the carrier element 100, the covering 200 may have a flexible region 204 in which the covering 200 is stretchable. The entire covering 200 may of course also be stretchable in design.

At least one electrical and/or electronic element 210 to 216 is integrated in the covering 200. This means that lighting means 210 and associated on and off switches 211 can be integrated in the covering 200. Smart fabrics, in particular, in which electrically conductive paths/fibers and/or electrical/electronic structural elements are integrated are suitable for this. The latter also include call buttons 215 which may optionally have a lighting means in order to display a switching state of the call button 215. Finally, illuminating symbols 216 may also be integrated in the covering 200.

When comparing FIGS. 2 and 3, it can be seen that the arrangement of the electrical/electronic elements 210 to 216 and other portions of the covering 200 is not limited to the arrangement depicted in each case. Hence, for example, the arrangement of the buttons/switches 211 in the examples according to FIGS. 2 and 3 are different. For this purpose, optical elements such as lenses (lens disks), diffusion disks, or the like, for example, which can be arranged in front of corresponding lighting means can be identified in FIG. 3. Openings 220 in the textile covering 200 for the fresh air supply or loud speakers can also be seen in FIG. 2, while there are no such openings in FIG. 3. Alternatively, the textile covering 200 may be air-permeable (for example, perforated) so that a closed textile surface is created, although fresh air can be supplied to each individual passenger and sound can also be transmitted through the textile covering 200. With a covering made of plastic, openings must be provided for both air and also for sound.

In order to allow access to oxygen masks, a perforation is provided in the covering 200 which defines an opening region 230 for the oxygen mask storage 130. This perforation can be torn open when a flap or similar closure of the oxygen mask storage 130 is opened (downwards in FIG. 1).

The passenger service unit 10 can be produced by putting the covering 200 over given portions of the carrier element 100. As can be seen in FIG. 3 in particular, a very thin (slender) passenger service unit 10 can thereby easily be created.

Figure 4:
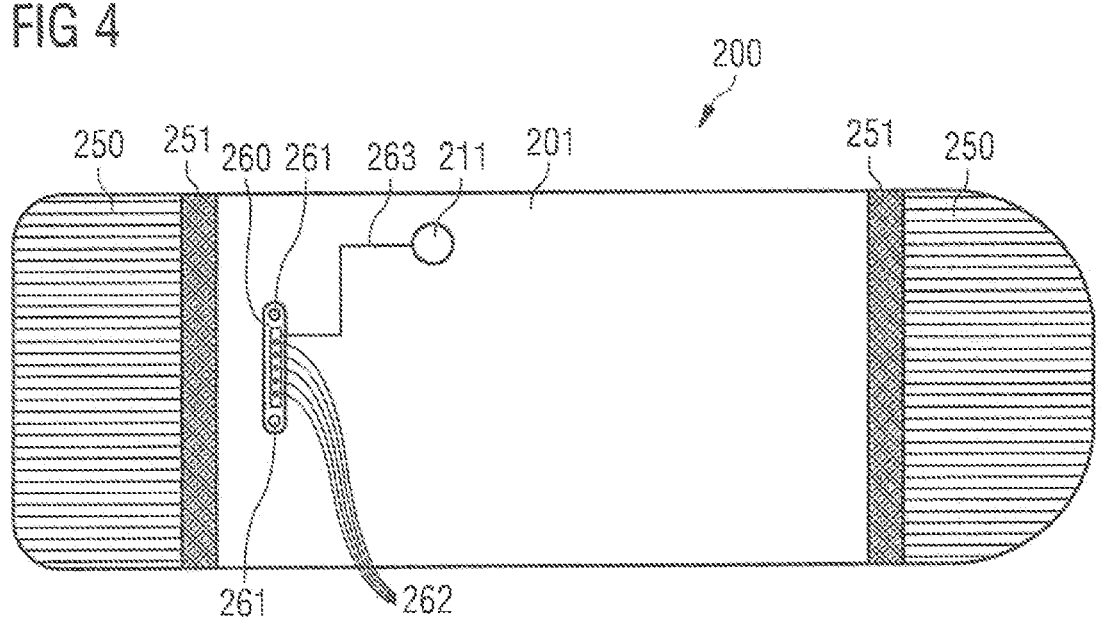
FIG. 4 shows schematically a view of the rear side of a covering.

The rear side of the covering 200 is schematically shown in FIG. 4. By way of example, a pocket 250 is formed at both ends of the covering 200. This can be achieved by folding over the ends 251 of the covering 200 on the rear side thereof, for example. In this way, the ends 251 in the side region (top and bottom in FIG. 4) can be connected to the main portion 201 of the covering 200. The entire side regions can of course be closed. In this way, pocket openings are created over the width of the covering 200 into which the ends (second portion 102 and third portion 103) of the carrier element 100 can be introduced. As a result the covering 200 is fitted onto the carrier element 100 like a sock.

A contact arrangement 260 with a plurality of contacts 262 may be located on the rear side of the covering 200. The contacts 262 are used to connect electrically conductive strip conductors 263 which are integrated in the covering 200. The strip conductors 263 enable the electrical/electronic elements 210 to 216 to be electrically connected to the contacts 262 of the contact arrangement 260. The strip conductors 263 can thereby be integrated in the covering 200 by being arranged in the fibers thereof or forming parts of the fibers of the covering 200. The contact arrangement 260 may, in addition, comprise a holding device 261 which is explained in greater detail with regard to FIGS. 16a and 16b.

Different embodiments of the passenger service unit 10 and the composition of the carrier element 100 and of the covering 200 are explained in greater detail with the help of FIGS. 5 to 8. Consequently, one end of the carrier element 100 can be threaded in at one end 203 of the covering 200 and then threaded in at an opposite end 202 of the covering 200. In this way, the covering 200 covers the carrier element 100. Pockets 250 (FIG. 4) can be formed at the ends 202, 203 into which the carrier element 100 fits in order to hold the covering 200.

Figure 5A:
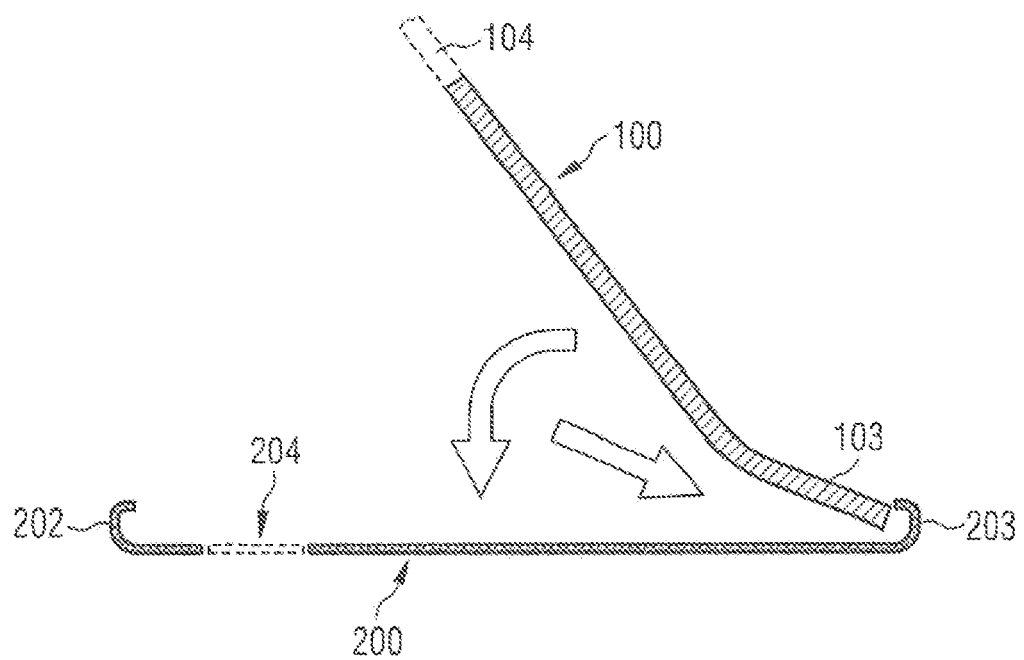
FIGS. 5a and 5b show schematically the insertion of a carrier element into a covering in a side sectional view.
Figure 5B:
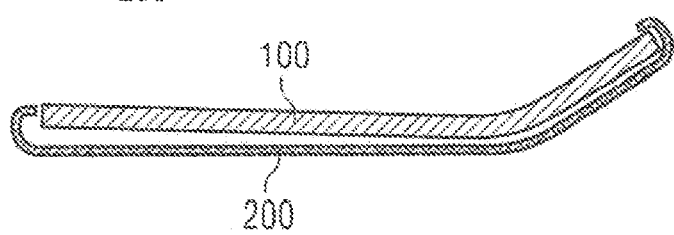

Alternatively or in addition, the covering 200 can be held on the carrier element 100 with a silicone covering (not separately shown). Likewise, it is possible for the silicone covering to touch the carrier element 100, while the covering 200—made of woven fabrics or textiles for example—is arranged on (for example, adhered to) the silicone covering. In this case, the ends 202, 203 of the covering 200 need not have a pocket-shaped design. Instead of this, a small overlapping region is sufficient, as shown in FIGS. 5a and 5b. The silicone covering may be stiffer by comparison with a more thinly configured, for example textile, covering 200, and therefore achieve a greater clamping effect on the carrier element 100. A flexible portion 204 of the textile covering 200 and/or of the silicone covering makes for easier application of the covering 200 to the carrier element 100.

Figure 6:
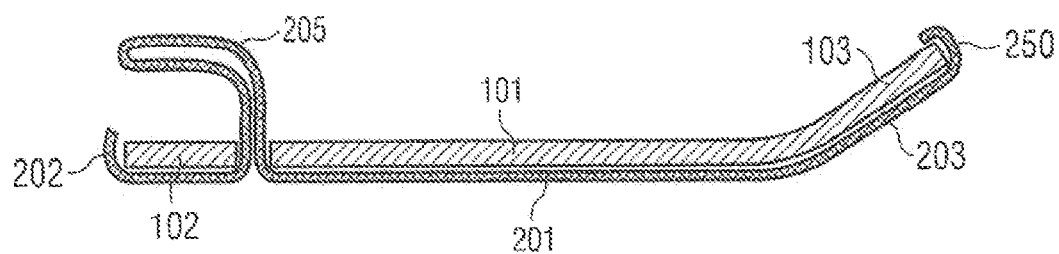
FIG. 6 shows schematically a side sectional view of an alternative embodiment of a passenger service unit.

Instead of, or in addition to, a flexible area 204 of the covering 200, a further portion 205 of the covering 200 may be inserted into an opening between the second portion 102 and first portion 101 of the carrier element 100 and be trapped there (see FIG. 6). Working in the same way, the portion of the carrier element 100 depicted on the left in FIG. 6 (denoted by reference number 102) may also be a carrier element 100 of a passenger service unit 10 arranged adjacently, while the covering 200 is stretched over multiple carrier elements 100 of multiple passenger service units 10. Where necessary, surplus material 205 of the covering 200 can be inserted and trapped between two carrier elements 100 in this case, as can be seen in FIG. 6.

Figure 7:
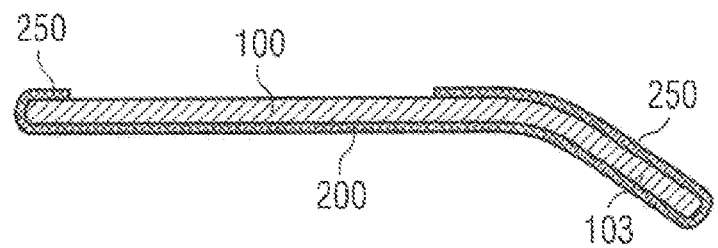
FIG. 7 shows schematically a side sectional view of a design variant of a passenger service unit.

The carrier element 100 may have an oblique portion 103 which, as shown in FIG. 6, is oriented to a rear side of the carrier element 100 or, as shown in FIG. 7, is oriented to a front side of the carrier element 100. In both cases, an oblique side is created which is easier to see for a passenger below the passenger service unit 10. This oblique portion 103 is particularly suitable for the arrangement of symbols 216 which provide the passenger with certain information, such as no smoking, fasten seatbelts, do not use electronic devices, etc.

Figure 8:
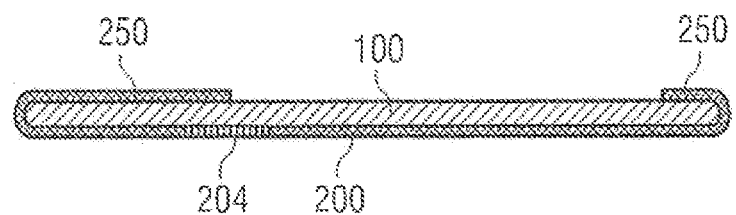
FIG. 8 shows schematically a side sectional view of a further design variant of a passenger service unit.

Equally, the carrier element 100 may also be continuously flat, as shown in FIG. 8. This shape is particularly suitable when no parts of the ceiling portion of the passenger sitting area 2 are to project into the seating area. As can likewise be seen in FIGS. 5 to 8, the overlapping regions 250 which form a pocket may be of different sizes. It is also possible, therefore, for a deeper pocket 250 to be provided in the region of an oblique portion 103 of the carrier element 100 (FIG. 7) or in the case of a stretchable portion 204 of the covering 200 (FIG. 8), in order to guarantee a better hold of the covering 200.

Figure 9A:
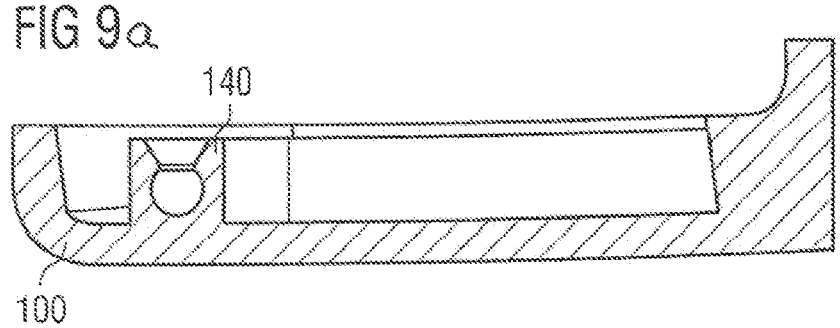
FIGS. 9a, 9b and 9c show schematically views of a fastening device for a covering to a carrier element.
Figure 9B:
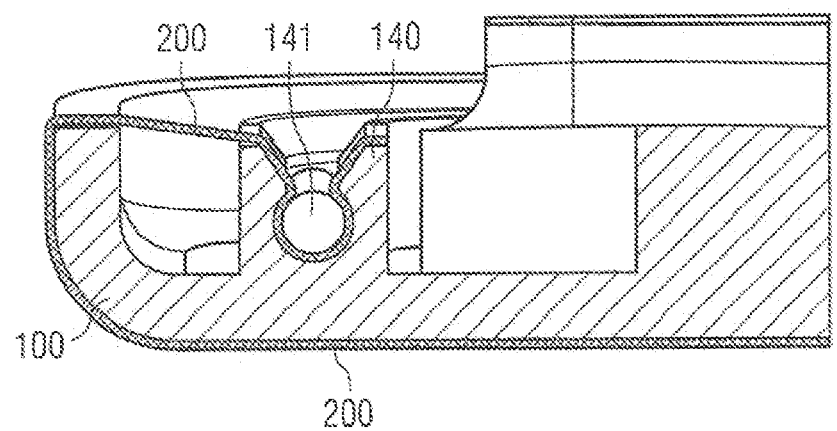
Figure 9C:
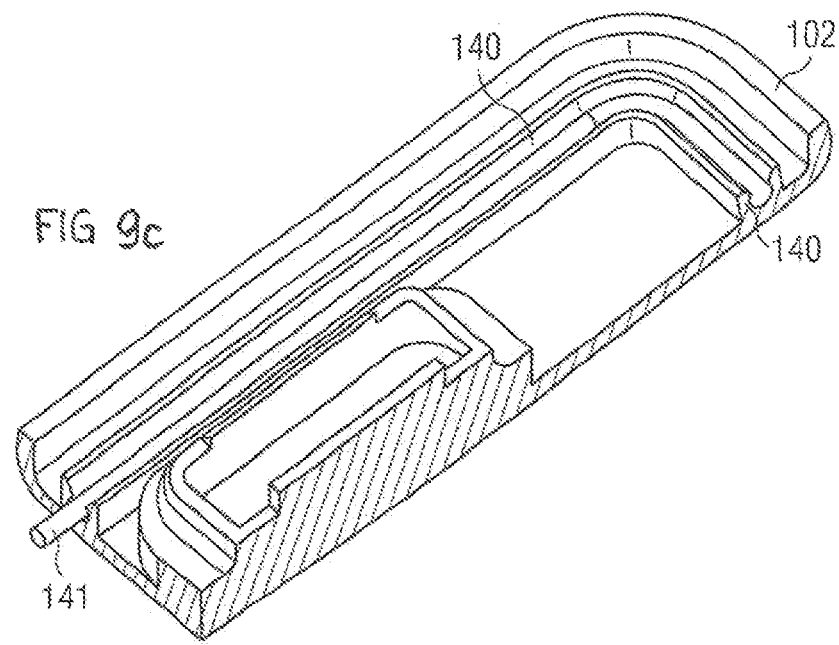

With reference to FIGS. 9a, 9b and 9c, a fastening device 140 may be provided to fasten the covering 200 to the carrier element 100. For this purpose, the carrier element 100 may have a fastening device 140 arranged circumferentially at least in sections which is particularly provided on a rear side of the carrier element 100. A simple form of the fastening device 140 may be a portion of Velcro (hook and loop fastener) strip comprising barbed hooks, wherein the barbed hooks can interlock with the covering 200.

A fastening device 140 which is frequently reusable and more flexible in the longitudinal direction of the carrier element 100 is depicted in FIGS. 9a, 9b and 9c. This is configured in the form of a groove on the rear side of the carrier element 100 into which a clamping cord 141 or similar elongate clamping element can be inserted. The clamping cord 141 in this case fits in a part of the groove 140 from which it can only be released through flexible deformation. One end of the covering 200 can be trapped between the clamping cord 141 and the groove 140. The groove 140 may taper in cross section to an opening, so that the clamping cord 141 has an even better hold or the clamping cord 141 is prevented from slipping out.

According to the same principle, the mountings 105 on the rear side of the carrier element 100 (FIG. 1) can be fastened in a vehicle 1 using a corresponding clamping device (not shown). The mountings 105 are similar in shape to the clamping cord 141 but are fastened to the rear side of the carrier element 100 or integrated therein. A clamping device which corresponds to the fastening device 140 is therefore provided on the vehicle 1, so that the clamping device in the vehicle 1 and the mounting 105 are inserted in one another and held by means of a clamping action.

The second portion 102 of the carrier element 100 is shown in greater detail in FIGS. 10a and 10b. In FIG. 10a the second portion 102 lies against the first portion 101 of the carrier element 100 (is the smallest distance from the first portion 101). In FIG. 10b, the second portion 102 is shown spaced apart from the first portion 101 of the carrier element 100. In this way, the length of the carrier element 100, and therefore of the passenger service unit 10, can be extended by the distance Δ. For the movement depicted linearly here, a rail 154 can be provided which is shown in detail in FIG. 11.

The rail 154 may be attached to the second portion 102, for example, and extend away therefrom. The rail 154 in this case may be brought into engagement with a corresponding elongate element 151, so that the rail 154 can only move in the longitudinal direction of the rail 154.

In addition, a locking device 150 may fix a relative position of the second portion 102 to the first portion 101 of the carrier element 100. In the variant of the locking device 150 depicted in FIG. 11, openings 152 are provided in the elongate element 151 on the first portion 101 in a predefined pattern. A corresponding locking element 153, in the form of a tab in this case, may be immersed in one of the openings 152, as a result of which a movement of the rail 154 relative to the elongate element 151 is blocked. The tab 153 may be pretensioned, for example, and, on reaching an opening 152, automatically move into the opening 152. For detachment, the tab 153 must be pulled out of the opening 152, as a result of which the second portion 102 of the carrier element 100 can be displaced again.

The predefined pattern may correspond to a pattern in which rows of seats can be arranged in the vehicle 1. For example, seat rails exhibit a corresponding pattern. If the patterns of the seat rail and the openings 152 coincide, when the seat distance between two seat rows increases, the length of the passenger service unit 10 can also be increased by the same amount. This means that a service channel in which the passenger service unit 10 is arranged can be closed off without additional covering panels.

Figure 12:
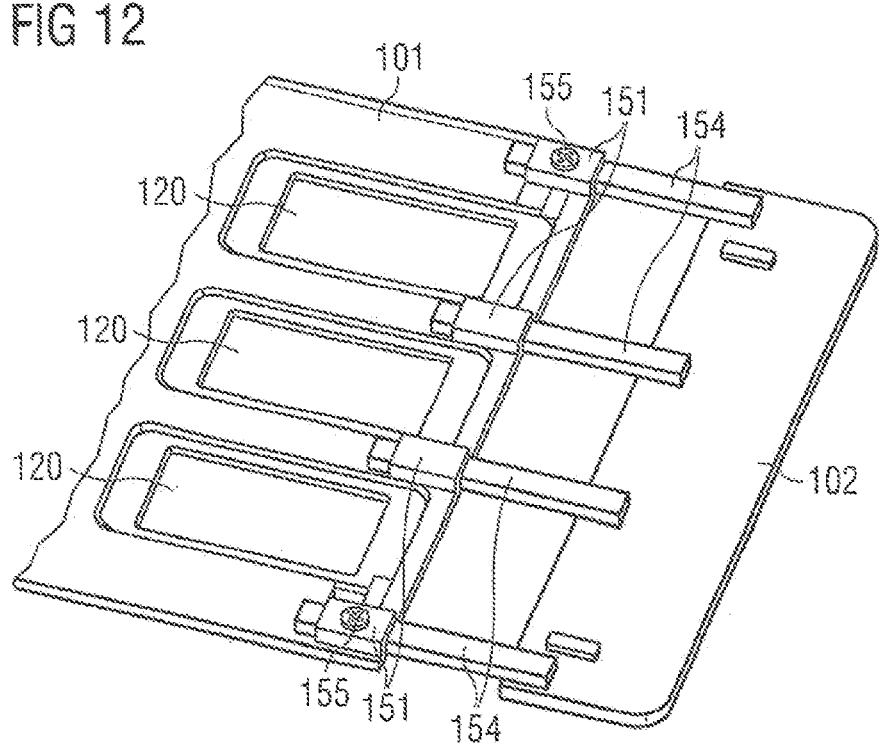
FIG. 12 shows schematically an embodiment of a movable portion of the carrier element.

FIG. 12 shows an alternative embodiment of a rail 154. The rail 154 of the second portion 102 has a rectangular cross section in this case which is introduced in a corresponding rectangular holding element 151. A screw 155 which clamps the rail 154 may be provided on this holding element 151. In this way, a gradual displacement and fastening of the second portion 102 relative to the first portion 101 can be guaranteed. Finally, FIG. 12 also shows openings 120 in the carrier element 100, in which fresh air nozzles or vents from fresh air lines and/or loud speakers can be arranged.

Figure 11:
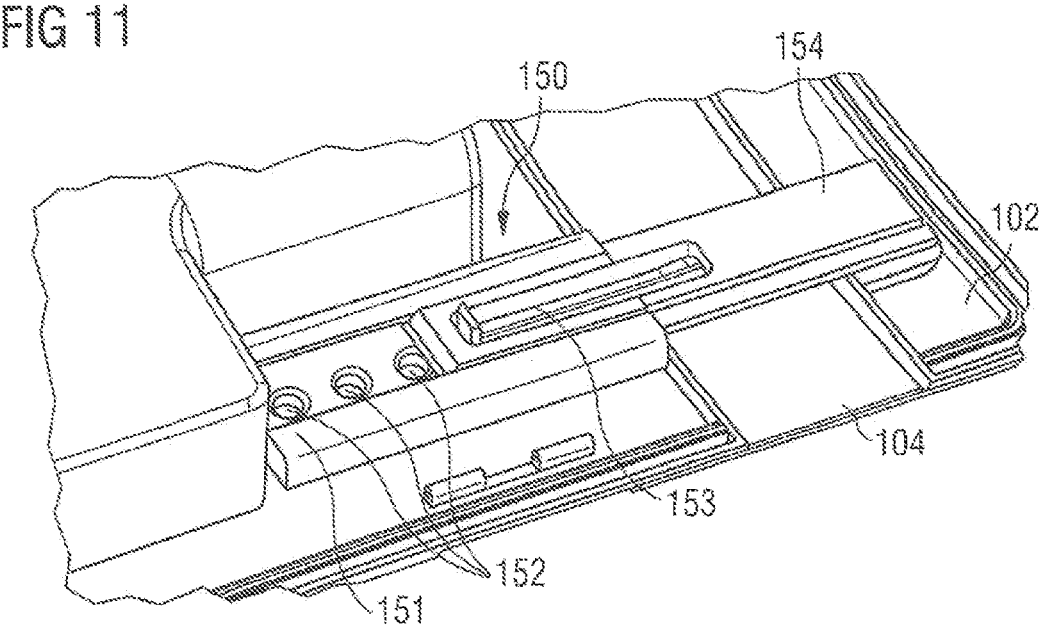
FIG. 11 shows schematically a locking device of the movable portion of the carrier element.

In all embodiments in FIGS. 10 to 12, the second portion 102 of the carrier element 100 can also be completely removed, as a result of which a dimension of the carrier element 100 can be shortened. As soon as the rail 154 is no longer engaged with the elongate (holding) element 151, the second portion 102 can be removed.

FIGS. 13 and 14 depict details of a pivotable portion 111 of the carrier element 100. Hence, a holding device 110 in the form of a receiving means can be provided on the rear side of the carrier element 100. A pivotable portion 111 of the carrier element 100 is inserted in the holding device 110, wherein the pivotable portion 111 can rotate at least partially in the holding device 110. For this purpose, the holding device 110 and the pivotable portion 111 may have corresponding spherical surfaces. In addition, the holding device 110 may comprise a magnet (not shown), in order to secure the pivotable portion 111 in the holding device 110. Alternatively, the holding device 110 may be large enough in size for the pivotable portion 111 not to be able to slip out.

The holding device 110 and the pivotable portion 111 may be provided at a position of the carrier element 100 which coincides with a position of one of the at least one electrical and/or electronic elements 210 to 216 in the covering 200 or matches this. Part of a Velcro strip 112 comprising barbed hooks is provided on a side of the pivotable portion 111 facing the covering 200. The barbed hooks of the Velcro strip 112 are set up to interlock with the covering 200. Part of a Velcro strip (not separately shown) comprising loops can of course also be provided on the covering 200, which comes into engagement with the barbed hooks 112. This means that the covering 200, as shown in FIG. 13, can be oriented by pivoting the pivotable portion 111.

The electrical/electronic element 210 to 216 provided at this position can therefore likewise be oriented by the pivotable portion 111. By way of example, a lighting means 210 in the form of a flat LED, for example, can be integrated in the covering 200 (as shown in FIG. 13) and lie adjacent to the pivotable portion 111 via the barbed hooks 112. In this way, the orientation of the lighting means (in particular the light cone) is made possible with the help of the pivotable portion 111.

Alternatively, as shown in FIG. 14, a lighting means 275 may also be arranged in the pivotable portion 111. The light from the lighting means 275 can emerge through an opening 113 in the pivotable portion 111. If the covering 200 has a light-permeable design at the position of the pivotable portion 111 (transparent and/or perforated and/or by means of an opening), a pivotable lamp can be realized in a simple and visually appealing manner.

For improved fixing of the covering 200, a further part of a Velcro strip 115 comprising barbed hooks may be arranged about the pivotable portion 111 on the carrier element 100. In this way, tensions through a larger area of the covering 200 during movement of the pivotable portion 111 are avoided.

A further embodiment of the arrangement of a lighting means 210 is shown in FIGS. 15a and 15b. For this purpose, the covering 200 may comprise cutouts which form two hook-shaped portions 271, 272. Electrical contact surfaces 273 may be provided at the respective ends of the hook-shaped portions 271, 272. In addition, electrical lines (strip conductors) may be provided in the portions 271, 272 and the areas of the covering 200 adjacent thereto. In this way, an electrical connection is integrated in the covering 200.

By virtue of the hook shape of the portions 271, 272 they can be moved in a plane that differs from the plane formed by the remaining part of the covering 200. In this way, the electrical contact surfaces 273 can be connected to an electrical/electronic component which is located outside the covering 200. For example, a lighting means 275 as shown on the right in FIG. 14 and in FIG. 15d in side view can be electrically connected to the electrical contact surfaces 273 of the portions 271, 272 (the portions 271, 272 are only provided with reference numbers for one of the lighting means 275 in FIG. 15b for greater clarity). Consequently, the lighting means 275 may comprise a base 276 which is fastened in the pivotable portion 111 of the carrier element 100, for example, and has corresponding electrical connections to which the contact surfaces 273 can be attached. This variant even allows the connection of larger electrical/electronic components.

The opening in the covering 200 created by the cutout can be closed by a visual element 212 as in FIG. 15c.

Figure 16A:
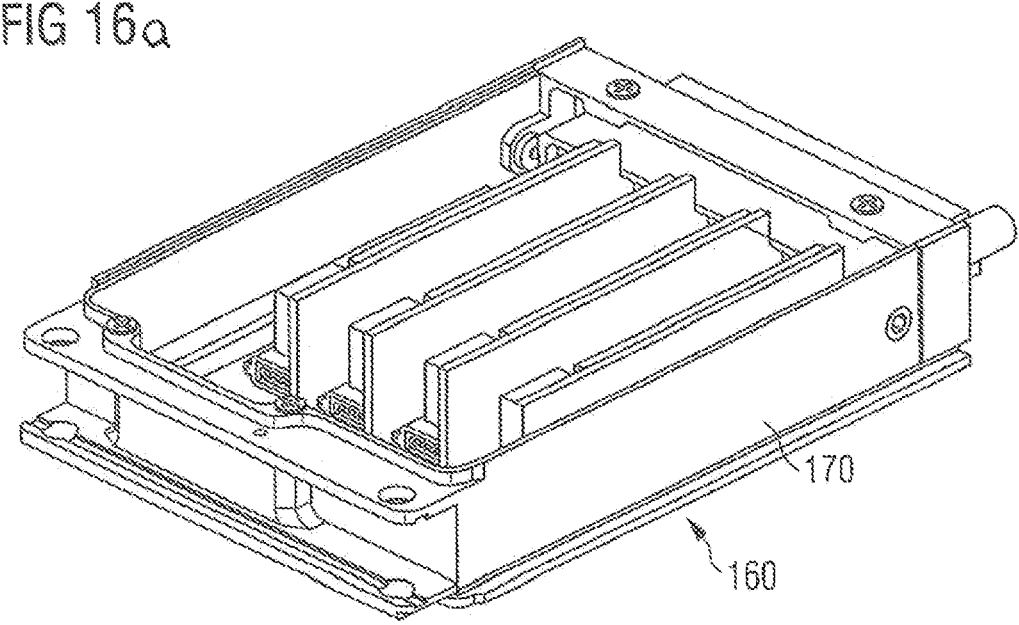
FIGS. 16a and 16b show schematically an electrical/electronic control system and contact arrangement of a carrier element.
Figure 16B:
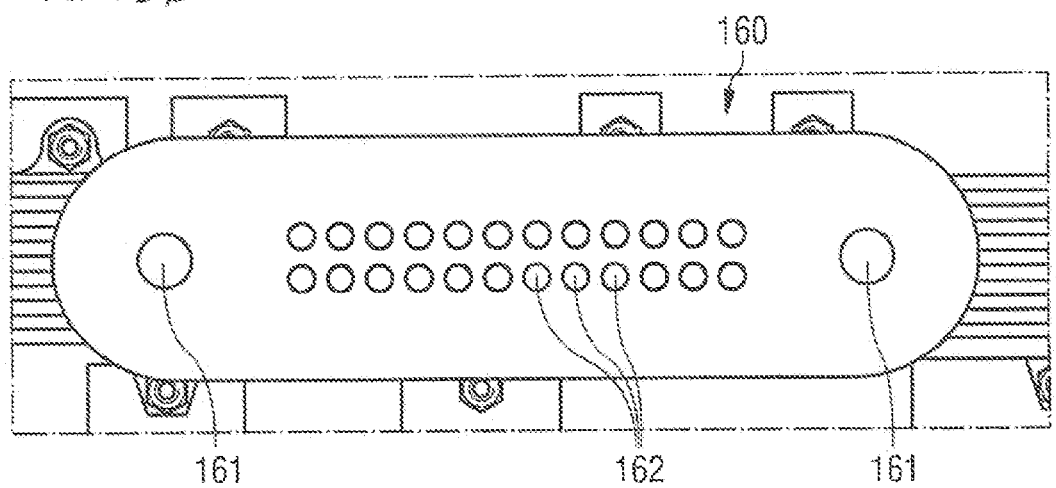

FIGS. 16a and 16b show schematically an electrical and/or electronic control system 170. This may be arranged on, and fastened to, the rear side of the carrier element 100, for example. Alternatively, the control system 170 may be arranged at any point of the vehicle. Alternatively or in addition, the control system 170 may also be at least partially integrated in the covering 200. The control system 170 serves to supply the electrical and/or electronic elements 210 to 216 in the covering 200 with electrical current and/or electrical signals. In order to connect the electrical/electronic elements 210 to 216 to the control system 170, the control system has a contact arrangement 160. The contact arrangement 160 may be provided with a plurality of contacts 162. The contacts 162 correspond in terms of their arrangement to the arrangement of the contacts 262 in the contact arrangement 260 of the covering 200 (see FIG. 4). By placing the contacts 162, 262 of the respective contact arrangements 160, 260 on top of one another, electrical connections can be made between the individual contacts and the lines attached thereto (for example lines 263 in the covering 200).

The contact arrangement 160 also has a holding device 161 which, in terms of its position relative to the contacts 162, corresponds to the holding device 261 on the covering 200 likewise relative to the contacts 262 thereof. For example, the holding devices 161, 261 may be at least one magnet, so that the two contact arrangements 160, 260 can easily be assembled and fixedly connected to one another, wherein at the same time the individual contacts 162, 262 come to rest on one another and against one another, in order to create an electrical connection. This shape of the electrical connection allows rapid installation of the covering 200 and, at the same time, rapid electrical connection via the contact arrangements 160, 260.

FIG. 1 shows schematically a region for the contact arrangement 160 on the carrier element 100. In this case, an opening in the carrier element 100 may be provided, for example, through which the contact arrangement 160 passes, so that the contact arrangement 260 of the covering 200 can reach this and make contact. It is likewise possible for the contact arrangement 160 to be integrated in the carrier element 100 and for a connection possibility for connection of the control system 170 to be provided on the rear side of the carrier element 100. In particular, when the control system 170 is not arranged on, and fastened to, the carrier element 100, only one connection possibility need be provided for the contact arrangement 160 of the carrier element 100.

Finally, FIG. 17 shows a schematic representation of a vehicle 1, in this case an aircraft, having a passenger seating area 2. At least one passenger seat 5 and an associated passenger service unit 10 is installed in the passenger seating area 2.

Multiple seats/rows of seats 5 can of course be provided behind one another in the vehicle 1, wherein a corresponding plurality of passenger service units 10 is arranged above each seat/row of seats 5. It is sufficient in this case for a corresponding plurality of carrier elements 100 to be arranged above each seat/row of seats 5 and for one individual covering 200 to cover at least two of the plurality of carrier elements 100. In this way, a uniform visual appearance can be achieved in the passenger seating area 2. It is also possible for a single contact arrangement 260 of the one covering 200 (and accordingly a single contact arrangement 160 in/on the carrier element 100) to be provided, by means of which all electrical/electronic elements 210 to 216 can be electrically connected to a control system 170.

Also by way of example, FIG. 17 shows a central control system 7 by means of which the at least one electrical/electronic element 210 to 216 can be controlled. For this purpose, the one covering 200 is electrically connected to the central control unit 7. For example, it may be a cabin management system 7 with which individual or all the electrical/electronic elements 210 to 216 can be controlled. The central control unit 7 may be provided in the cabin or, alternatively, in a cockpit of the vehicle 1. The central control system 7 may of course also be electrically coupled to a control system 170 in/on the carrier element 100 and/or a control system 170 in the covering 200, and interact therewith in order to control the at least one electrical/electronic element 210 to 216.

The exemplary embodiments and variants described above are only used to illustrate the invention. All examples, variants and individual details can be combined with one another in any way, in order to create given embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger service unit for installation in a passenger seating area of a vehicle, the passenger service unit comprising:

a carrier element that is extendable in a longitudinal direction, wherein the carrier element comprises a first portion and a second portion, the first portion and the second portion of the carrier element being coupled to one another in a linearly movable manner via at least one rail in the longitudinal direction; and a covering in which at least one electrical and/or electronic element is integrated, wherein the covering covers at least a section of the carrier element.

2. The passenger service unit as claimed in claim 1, wherein the covering forms a pocket in which the carrier element is at least partially inserted, so that the covering is fastened to the carrier element.

3. The passenger service unit as claimed in claim 1, wherein a locking device fixes a relative position of the second portion to the first portion of the carrier element.

4. The passenger service unit as claimed in claim 1, wherein the covering is stretchable at least sectionally.

5. The passenger service unit as claimed in claim 1, wherein the carrier element comprises a fastening device to fix a circumferential edge of the covering to the carrier element, the fastening device arranged, at least in sections, circumferentially about an edge of the carrier element.

6. The passenger service unit as claimed in claim 1, wherein the at least one electrical and/or electronic element comprises at least one of a call button and/or a switch for lighting, a lighting means or an illuminated or illuminating symbol.

7. The passenger service unit as claimed in claim 6, wherein the carrier element comprises a portion that is pivotable as compared with a remaining portion of the carrier element, a position of the pivotable portion coinciding with a position of one of the at least one electrical or electronic element, and wherein the pivotable portion of the carrier element is fitted with part of a hook and loop strip comprising barbed hooks on a side facing the covering, the barbed hooks being set up to interlock with the covering.

8. The passenger service unit as claimed in claim 1, wherein an electrically conductive strip conductor which is electrically connected to the at least one electrical or electronic element is integrated in the covering.

9. The passenger service unit as claimed in claim 8, wherein the covering comprises a contact arrangement with a plurality of contacts for connecting the electrically conductive strip conductor.

10. The passenger service unit as claimed in claim 9, wherein the carrier element comprises a contact arrangement with a plurality of contacts which are set up to make electrical connections with the plurality of contacts in the contact arrangement of the covering by making reciprocal contacts, and wherein at least one of the contact arrangement of the carrier element comprises a holding device or the contact arrangement of the covering comprises a holding device.

11. The passenger service unit as claimed in claim 1, further comprising:

oxygen mask storage which is set up to receive oxygen masks and, in an emergency, to clear an opening for access to the oxygen masks, and wherein the covering has a perforation, a position of which corresponds to the opening of the oxygen mask storage.

12. A passenger seating area for a vehicle, comprising:

at least one passenger service unit as claimed in claim 1, wherein the at least one passenger service unit is arranged in a ceiling area of the passenger seating area above at least one passenger seat.

13. The passenger seating area as claimed in claim 12, wherein the carrier element of the at least one passenger service unit comprises an oblique portion, and wherein the oblique portion extends from the ceiling area of the passenger seating area towards the passenger seat.

14. A vehicle having at least one passenger service unit as claimed in claim 1.

15. A vehicle having at least one passenger seating area as claimed in claim 12.

* * * * *